June 19, 1951 F. H. HAGNER 2,557,654
DIRECTION INCLINATION INDICATOR
Filed Sept. 14, 1945 2 Sheets-Sheet 1
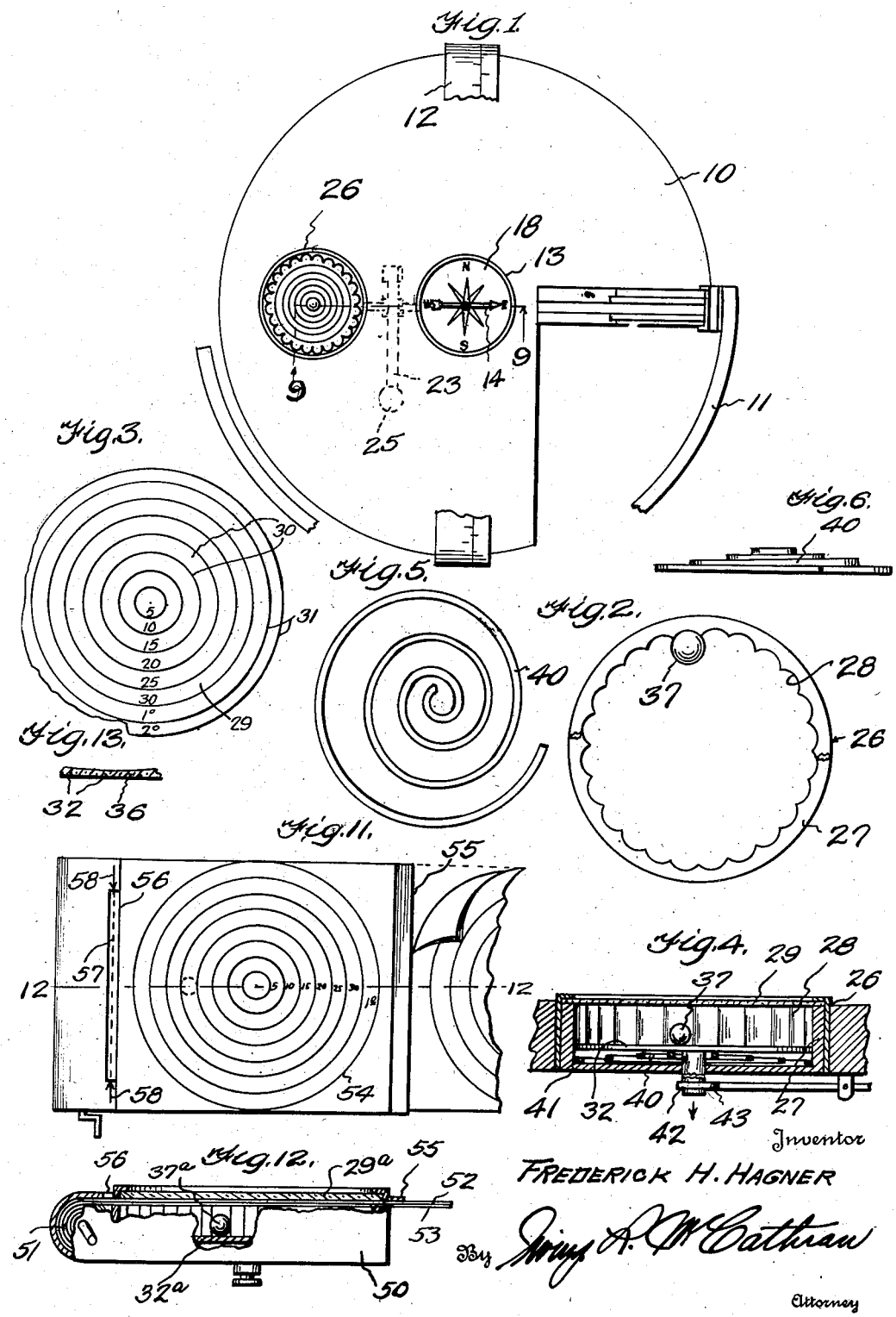
Inventor
FREDERICK H. HAGNER June 19, 1951  F. H. HAGNER  2,557,654
DIRECTION INCLINATION INDICATOR
Filed Sept. 14, 1945  2 Sheets-Sheet 2
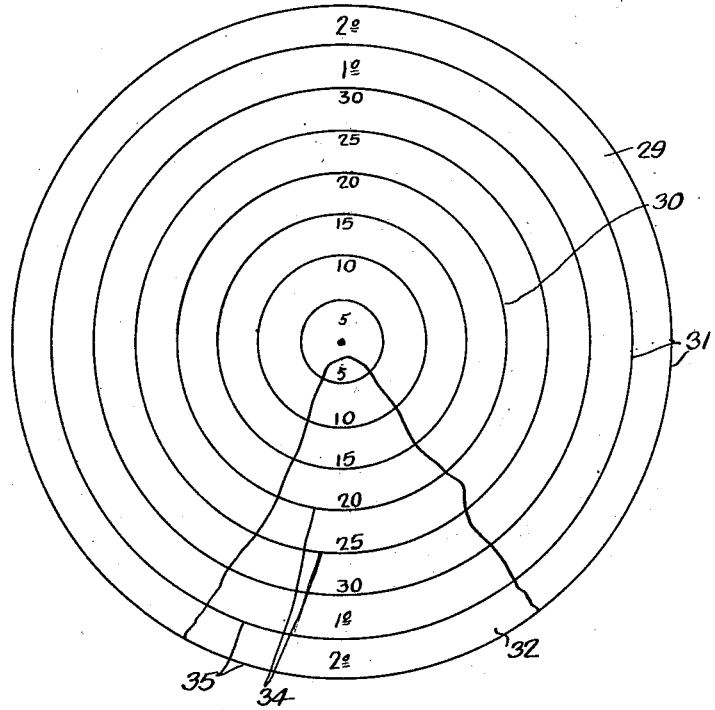
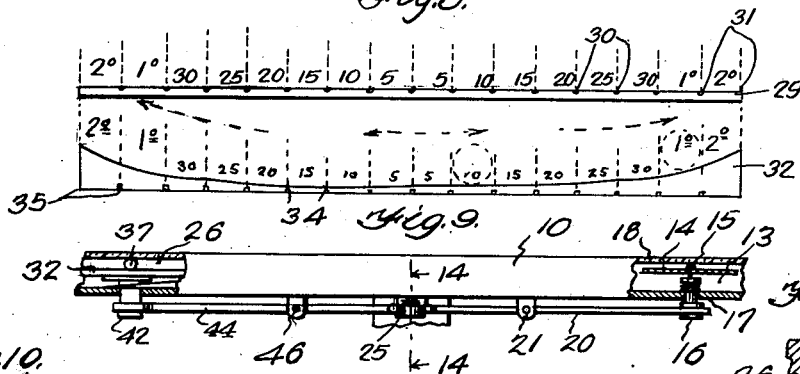
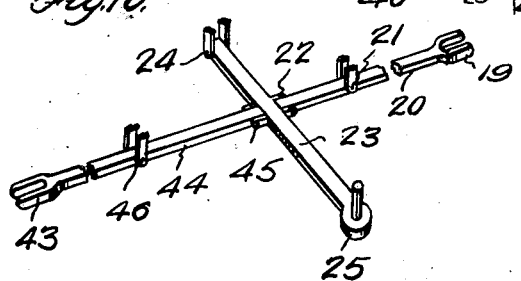
Inventor
FREDERICK H. HAGNER
By
Attorney Patented June 19, 1951

2,557,654

UNITED STATES PATENT OFFICE 2,557,654

DIRECTION INCLINATION INDICATOR

Frederick H. Hagner, San Antonio, Tex.

Application September 14, 1945, Serial No. 616,205

3 Claims. (Cl. 33—206)

This invention relates to a direction inclination indicator, or a level indicating and recording device for use upon observation instruments and the like for recording or indicating the level position of the instrument at the time of observation.

Another object of this invention is the production of a simple and efficient means for determining the direction of tilt of an observation instrument with respect to zenith while making a celestial observation.

Other objects and advantages of this invention will appear throughout the following specification and claims.

In the drawings:

Figure 1 is a top plan view of the supporting table of an observation instrument upon which the level indicating device is mounted;

Figure 2 is a top plan view of the casing of the level indicating device;

Figure 3 is a plan view of the transparent cover plate a portion of the edge thereof being broken away;

Figure 4 is a transverse sectional view taken through the level indicating device;

Figure 5 is a plan view of the coil spring which is carried by the level indicating device;

Figure 6 is a side elevational view of said coil spring;

Figure 7 is a top plan view illustrating the concentric graduation marks formed upon the transparent cover plate and the ball-supporting plate of the level indicating device, the cover plate being broken away to show the ball-supporting plate;

Figure 8 is a diagrammatic side view of the ball-supporting plate of the level indicating device illustrating the curvature thereof;

Figure 9 is a sectional view taken on line 9—9 of Figure 1;

Figure 10 is a perspective view of the lever mechanism for locking level indicating device and compass in a set position;

Figure 11 is a top plan view of a modified form of level indicating device having a recording means;

Figure 12 is a sectional view taken on line 12—12 of Figure 11, certain parts being shown in elevation;

Figure 13 is a detail sectional view taken through the plate of the level indicating device upon which the ball rolls;

Figure 14 is a sectional view taken on line 14—14 of Figure 9.

By referring to the drawings it will be seen that 10 designates the supporting table of the instrument similar to that illustrated in my co-pending application relating to a Celestial Observation Instrument filed September 20, 1945, Serial Number 617,636. This table is supported in a manner similar to said co-pending application and carries the various arcs such as the declination arc 11 and the hour angle arc 12. A compass 13 is carried by the table 10 in any suitable position preferably at its center and this compass carries a compass needle 14 which is supported upon a journal 15 carried by the spring-pressed supporting pin 16. This pin 16 carries an expansion spring 17 which normally carries the knob of the magnetized needle 14 against the under face of the glass cover 18 of the compass 13. The supporting pin 16 is engaged by the fork-shaped end 19 of the link 20 and may be moved to a position to pull down upon the pin 16 and release the needle 14 from engagement with the under face of the cover plate 18 of the compass 13 by allowing the needle 14 to drop out of contact with the plate 18 and thereby permit the needle 14 to freely function without interference and to rotate freely upon the supporting journal 15. The link 20 is pivoted, as at 21, and the inner end of the link 20 is pivotally connected, as at 22, to one side of the operating lever 23. The needle 14 is normally forced into abutting contact with the under face of the plate 18 by the spring 17.

The operating lever 23 is pivotally connected, as at 24, below the table 10, and the outer end of the operating lever 23 is provided with a spring-pressed button or knob 25 which carries a pin 26 working in a socket 27 in the under face of the table 10 to normally urge the knob 25 downwardly and normally force the outer ends of the links 20 and 44 upwardly to hold the needle 14 and the ball 37 in clamped engagement against the respective plates 18 and 29. It should be understood that the connections 21, 22, 45 and 46, are loose connections merely to hold the parts against displacement but permitting freedom of movement sufficient to allow the links 20 and 44 to swing and also to allow the lever 23 to operate to swing the levers 20 and 44. The needle 14 and the ball 37 are released for free movement when the operator presses upwardly upon the knob 25 thereby causing the outer ends of the links 20 and 44 to pull downwardly upon the pin 16 and stud 42 respectively, thereby permitting the ball 37 and the needle 14 to drop out of clamped engagement with the respective plates 29 and 18. Any suitable or desired operating lever means may be employed without departing from the spirit of the invention.

A level indicating device 26 is carried by the table 10 to one side of the compass 13. This level indicating device 26 comprises a casing 27 having a scalloped vertically extending rim 28, the scallops being formed on the inner face of the rim and extending vertically, as shown. A transparent cover plate 29 fits over the top of the casing 27 and is concentrically graduated, as at 30 in minutes, the graduations extending from the center from 5 to 30 minutes of an arc and the space between the two outer concentric rings being graduated, as at 31 for one degree of arc to match the graduations on the ball-supporting plate 32. The plate 32 is transparent and is also graduated upon its lower face and is dished or curved to provide a concave upper face, the curvature of the arc or upper face of the plate extending from the center and being graduated from 5 to 30 minutes of an arc, and by being graduated and curved for the distance of two spaces for one degree of arc each as indicated in the diagram in Figures 7 and 8. The plate 32 as shown in detail in Figure 8, is provided with a plurality of concentric circles or graduations 34 indicating from 5 to 30 minutes of an arc, and 35 indicating one degree of arc each. These lines 34 and 35 are preferably cut into the lower face of the plate 32 and are filled with luminous material 36 to facilitate the reading thereof in darkness. The graduations 34 and 35 and the graduations 30 and 31 are adapted to be in vertical alignment to facilitate the reading of the instrument and to facilitate the reading of the position of the leveling ball 37.

This invention provides a means for determining the tilt of the instrument from zenith by noting the position of the ball relative to the scale, the instrument being so constructed as to permit the reading of the instrument during the day or night because of the luminous material on the scales. The instrument may be placed in abutment with an object and the ball may be locked in position to make a record of the angle of the object, and the record may be subsequently read without the necessity of observation at the time of making the record.

The plate 32 is preferably made of transparent material and is preferably ground to a concave curvature where one inch in diameter equals one degree of arc. Beyond the circumference of one inch from the center of the plate, this plate 32 is ground to a concave curvature to a dimension of one-eighth inch to equal one degree. The purpose of this arrangement is to provide means to indicate to an observer that the instrument is tilted one degree or more, and to give the direction of tilt from true zenith. The ball 37 is adapted to roll freely upon the plate 32 and the scalloped inner face 28 of the rim 27 serves to keep the ball from rolling around the outer edge and holds the ball when it contacts the scalloped edge so that the ball will not roll around the inner periphery of the casing. As the ball rolls toward the edge or periphery of the plate the increased tilt or curvature will cause the speed of the ball to be reduced as the ball climbs up this increased curvature.

The plate 32 is preferably supported by an expansion spiral spring 40 which rests upon the bottom 41 of the level indicating device 26 to normally force the ball 37 in clamping engagement with the under face of the transparent cover plate 29 and hold the ball in a set position. A depending stud 42 is carried by the plate 32 and is engaged by the fork-shaped end 43 of the link 44, the link 44 being pivotally connected at its inner end, as at 45, to the operating lever 23. This link 44 is pivoted intermediate its end as at 46 below the table 10.

It should be understood that by means of the operating lever 23 an operator when making an observation may lock the needle 14 of the compass 13, and also lock the ball 37 in position by releasing pressure upon the knob 25. The ball 37 and the needle 14 normally are held in a locked position, and the operator places his thumb or finger against the knob 25 lowering the plate 32 and releasing the ball 37 and lowering the needle 14 thereby permitting the ball 37 to roll freely over the upper face of the plate 32 and also allowing the needle 14 to freely swing upon its journal 15. As soon as the observation is made, the operator releases his finger from the knob 25 and the ball 37 is at once locked in the position in which it happens to be at that instant, and the magnetic needle 14 is also locked in the position in which it happens to be at that instant. Therefore at his leisure the operator may observe the position of the ball 37 and he may observe the position of the magnetic needle to make his proper correction and allowance of the inclination of the table 10 and the direction of the needle 14.

In the form shown in Figures 11 and 12, a level indicating device 50 is illustrated which operates and is constructed similarly to that above described, with the exception that the casing of the indicating means 50 is provided with a reel 51 which supports a recording sheet 52 and a carbon sheet 53, these sheets 52 and 53 passing under the plate 29$^a$. The sheet 52 carries a series of charts 54 which may be brought into proper registration with similar markings on the plate 32$^a$ which is constructed similarly to the plate 32 described above. The ball 37$^a$ is adapted to make a mark upon the under face of the sheet 52 by pressing against the carbon sheet 53 when the plate 32$^a$ locks the ball 37$^a$ in position to record the position of the ball at the time of observation and when the ball is locked. The sheets 52 and 53 may be unrolled and torn off against the cutting edge 55 of the casing of the device, and a sighting aperture 56 is provided for sighting the dotted line 57 on the sheet 52 to indicate that the chart 54 is in a proper position when this dotted line 57 registers with the arrows 58. By means of this device, a recording means is provided to record the position of the ball at any selected time.

Having described the invention, what is claimed as new is:

1. A direction and inclination indicator comprising a casing having an open upper end, a transparent cover-plate closing said open upper end, a missile-supporting plate mounted within said casing and having a missile-supporting face, a gravity-controlled rollable missile mounted for free unobstructed movement within said casing and in contacting relation across the face of said supporting plate, the missile being free to move circumferentially of said plate and diametrically across the entire face of said supporting plate, said supporting plate being bodily movable toward and away from said cover-plate throughout its entire area within the casing, and a manually controlled actuating means carried by said casing and engaging said supporting plate for bodily moving said supporting plate toward said cover-plate to clamp said missile between the supporting plate and the transparent cover-plate to indicate the position of the missile upon the supporting plate at a selected time and to thereby indicate direction of tilt and to facilitate the measurement of the degree of inclination of said casing at the instant the missile is clamped between the cover-plate and the supporting plate.

2. A direction and inclination indicator comprising a casing having an open upper end, a transparent cover-plate closing said open upper end, a missile-supporting plate mounted within said casing and having a missile-supporting face, a gravity-controlled rollable missile mounted for free unobstructed movement within said casing and in contacting relation across the face of said supporting plate, the missile being free to move circumferentially of said plate and diametrically across the entire face of said supporting plate, said supporting plate being bodily movable toward and away from said cover-plate throughout its entire area within the casing, a manually controlled actuating means carried by said casing and engaging said supporting plate for bodily moving said supporting plate toward said cover-plate to clamp said missile between the supporting plate and the transparent cover-plate to indicate the position of the missile upon the supporting plate at a selected time and to thereby indicate direction of tilt and to facilitate the measurement of the degree of inclination of said casing at the instant the missile is clamped between the cover-plate and the supporting plate, and said casing having a scalloped vertically extending inner periphery adjacent the supporting plate, the scallops being of a size to receive said missile as the missile strikes the periphery of the casing to thereby prevent said missile from rolling around the periphery of the casing.

3. A direction and inclination indicator comprising a casing having an open upper end, a transparent cover-plate closing said open upper end, a missile-supporting plate mounted within said casing and having a missile-supporting face, a gravity-controlled rollable missile mounted for free unobstructed movement within said casing and in contacting relation across the face of said supporting plate, the missile being free to move circumferentially of said plate and diametrically across the entire face of said supporting plate, said supporting plate being bodily movable toward and away from said cover-plate throughout its entire area within the casing, a manually controlled actuating means carried by said casing and engaging said supporting plate for bodily moving said supporting plate toward said cover-plate to clamp said missile between the supporting plate and the transparent cover-plate to indicate the position of the missile upon the supporting plate at a selected time and to thereby indicate direction of tilt and to facilitate the measurement of the degree of inclination of said casing at the instant the missile is clamped between the cover-plate and the supporting plate, said casing having a scalloped vertically extending inner periphery adjacent the supporting plate, the scallops being of a size to receive said missile as the missile strikes the periphery of the casing to thereby prevent the missile from rolling around the periphery of the casing, and said supporting plate being of a concave curvature upon its missile supporting face having concentric circle graduations which are graduated five to thirty minutes of an arc from the center outwardly and which are also graduated for two additional spaces for one degree of arc in each additional space.

FREDERICK H. HAGNER.

REFERENCES CITED

The following references are of record in the file of this patent:

UNITED STATES PATENTS

| Number | Name | Date |
|---|---|---|
| 845,875 | Lewis | Mar. 5, 1907 |
| 856,990 | Schweder | June 11, 1907 |
| 1,665,058 | Hanna | Apr. 3, 1925 |
| 1,786,184 | Woodmansee | Dec. 23, 1930 |
| 1,868,361 | Leger | July 19, 1932 |
| 1,889,921 | Jakosky | Dec. 6, 1932 |
| 1,891,401 | Bowlus | Dec. 20, 1932 |
| 2,098,476 | Webster | Nov. 9, 1937 |
| 2,127,878 | Martin | Aug. 23, 1938 |
| 2,330,603 | McNally | Sept. 28, 1943 |
| 2,353,586 | Reininger | July 11, 1944 |

FOREIGN PATENTS

| Number | Country | Date |
|---|---|---|
| 118,540 | Great Britain | Feb. 11, 1918 |
| 124,606 | Great Britain | 1919 |
| 342,757 | Great Britain | Feb. 5, 1931 |